March 31, 1925.
E. WEIL
LIGHTING SYSTEM FOR VEHICLES
Filed Oct. 12, 1923
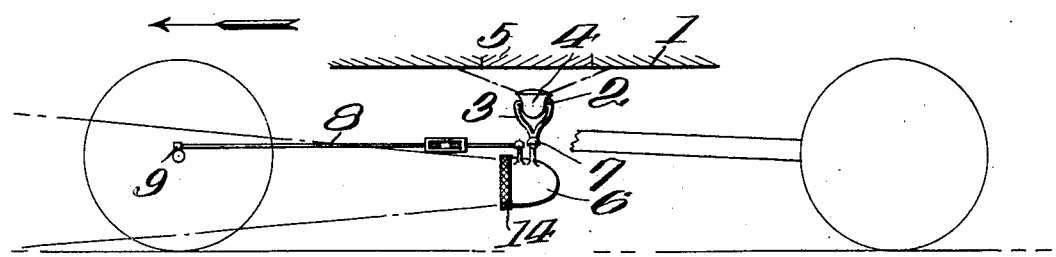
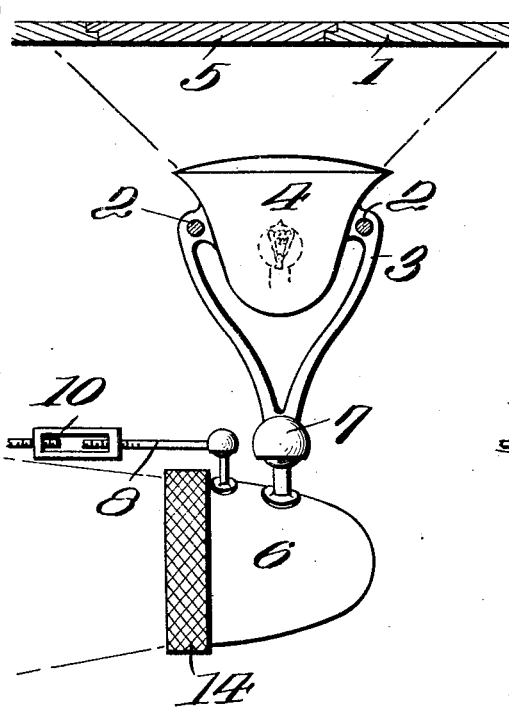
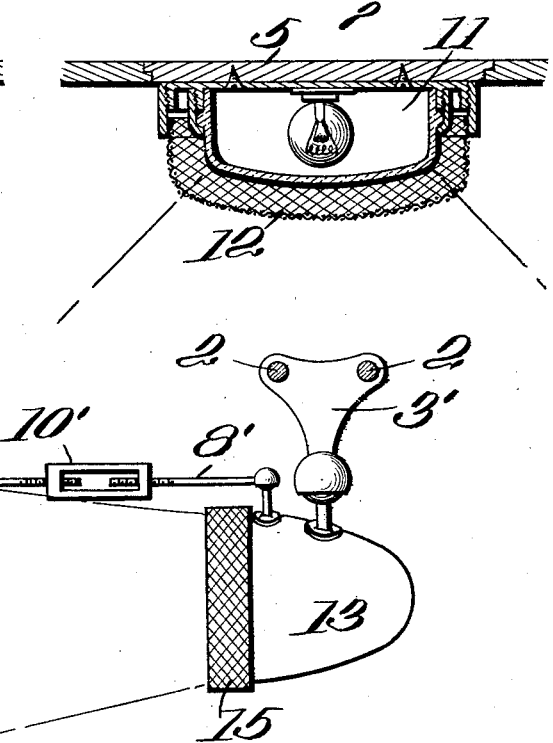
Inventor
EMILE WEIL.
By
Sturtevant & Mason Attorneys Patented Mar. 31, 1925.

1,531,533

UNITED STATES PATENT OFFICE.

EMILE WEIL, OF NEW ORLEANS, LOUISIANA.

LIGHTING SYSTEM FOR VEHICLES.

Application filed October 12, 1923. Serial No. 668,140.

*To all whom it may concern:*

Be it known that I, EMILE WEIL, a citizen of the United States, residing at New Orleans, in the parish of Orleans, State of Louisiana, have invented certain new and useful Improvements in Lighting Systems for Vehicles, of which the following is a description, reference being had to the accompanying drawing and to the figures of reference marked thereon.

This invention relates to lighting systems for vehicles, and particularly to automobiles.

The present invention in certain aspects relates to improvements upon the invention disclosed in my prior application, Serial Number 656,163, filed August 7, 1923, wherein a source of light is illustrated as mounted beneath a vehicle body in such a position that its direct rays are hid from an approaching eye, but are disposed so as to cast a field of light outwardly at the sides, front and rear of the vehicle to form a field of light beneath and about the base of the vehicle so that it will be silhouetted to an approaching observer.

One of the objects of the present invention resides in arranging a lighting means beneath the vehicle body in such a manner that the light will not only form a field of light as above noted, but will also project rays of light far in advance of the vehicle, but below a median horizontal plane of the vehicle, so that they are not projected into the eye of the approaching observer.

Still another object of this invention resides in providing means for swinging the forwardly projected light rays to the left or right corresponding to the turning of the vehicle.

These and other objects of the invention will be apparent from a perusal of the following specification when taken in connection with the accompanying drawing, wherein Figure 1 is a side elevational view of one form of the invention as positioned beneath a motor vehicle, Fig. 2 is an enlarged view of the lighting means, and Fig. 3 is a modified form of the arrangement shown in Fig. 2.

Referring now more particularly to the drawings, the base 1 of the vehicle body forms a support for two rods 2 upon which is mounted a bracket 3 carrying in its upper portion a light 4. This light is illustrated as a headlight having a dimmer attachment. The headlight is arranged to project the rays of light upwardly directly against the bottom of the vehicle 1 or against such elements directly thereabove. In the drawings, the surface directly over light 4 is illustrated as the vehicle floor which is provided with a door or trap 5 to permit cleaning and inspection of the lights. This surface may be provided with a reflector, if desired, or may be painted white to augment the reflection. With the arrangement disclosed, the rays of light from light 4 are projected upwardly and are thence reflected downwardly and outwardly to form a field of light beneath and about the base of the vehicle so that the latter is silhouetted at night time and can be plainly discerned by an approaching driver or pedestrian without the usual and objectionable glare from the approaching headlights.

Mounted on bracket 3, at the lower portion thereof, is a second light 6, preferably provided with a universal mounting 7 so that the light can be turned as desired. The location of this light 6 is substantially centrally beneath the vehicle body and substantially in a plane passing through the front and rear wheels. By this location the rays of light projected therefrom forwardly of the vehicle are confined substantially below the median horizontal plane of the vehicle and do not project into the eye of an approaching observer when within a predetermined distance from the vehicle. There is thus provided a lighting means which not only assures the silhouetting field of light as in my former application, but also provides a headlight disposed so as to prevent the objectionable glare into the eyes of the approaching observer.

It must be manifest that light 6 can be constructed and arranged to accomplish the function of both lights 4 and 6. For instance, light 6 may be mounted on side trunnions and may have its upper face formed with an opening and lens to project its rays also upwardly against the vehicle bottom as does the light 4. So also, light 6 may be formed with a rear red light hole to provide a parking light. In lieu thereof, the dimmer arrangement of light 4 will provide the parking light.

Means is provided for turning light 6 corresponding to the turning of the front wheels so that the light rays projected forwardly will be swung or turned to left or right on, or substantially on, a radius tangent to the turn of the front wheels. This is accomplished by providing a connecting rod 8 between the light 6 and the knuckle 9 of the front steering rod. Preferably the rod 8 is fortified with a turn buckle 10 adapted to vertically raise or lower the light 6 on its mounting 7 as the turnbuckle is adjusted. This adjusts the vertical inclination of the light rays.

In Fig. 3, another arrangement is provided. In this form, the silhouette lighting is accomplished by a separate light 11 suitably attached to the base of the car body, as for instance, to the trap 5. This light is provided with a wire screen 12 to protect it from solid objects, and lights 6 and 13 are likewise screened as illustrated at 14 and 15. In Fig. 3, the bracket 3' carries only the single light 13 which provides the forwardly projected rays. The arrangement is similar in other respects.

It is obvious that minor changes in the details of construction and the arrangement of the parts may be made without departing from the spirit of the invention, as set forth in the appended claim.

Having thus described the invention, what I claim as new and desire to secure by Letters Patent, is—

A lighting system for motor vehicles comprising a bracket carried beneath and substantially centrally of the vehicle, a headlight mounted thereon in position to project rays of light forwardly ahead of said vehicle substantially below the median horizontal plane of the vehicle, whereby said light is hidden from view by an approaching vehicle or pedestrian, means for connecting said headlight to the steering mechanism whereby the light is turned as the front wheels are turned, a second light carried by said bracket above said headlight, said second light being positioned so as to project its rays of light upwardly against the bottom of the vehicle whereby the rays are reflected downwardly and outwardly to form a field of light beneath and about the base of the vehicle, said second light being likewise hidden from view by an approaching vehicle or pedestrian.

In testimony whereof, I affix my signature.

EMILE WEIL.